(12) United States Patent
Pance et al.

(10) Patent No.: US 8,610,726 B2
(45) Date of Patent: Dec. 17, 2013

(54) COMPUTER SYSTEMS AND METHODS WITH PROJECTED DISPLAY

(75) Inventors: Aleksandar Pance, Saratoga, CA (US); Reese T. Cutler, Mountain View, CA (US); Aaron Leiba, San Francisco, CA (US); David Robbins Falkenburg, San Jose, CA (US); Jason Hau-Ping Chen, Santa Clara, CA (US); Alex Crumlin, San Jose, CA (US); Ken McAlpine, Hampton (GB)

(73) Assignee: Apple Inc., Cupertino, CA (US)

( * ) Notice: Subject to any disclaimer, the term of this patent is extended or adjusted under 35 U.S.C. 154(b) by 574 days.

(21) Appl. No.: 12/238,633

(22) Filed: Sep. 26, 2008

(65) Prior Publication Data

US 2010/0079468 A1    Apr. 1, 2010

(51) Int. Cl.
*G06F 15/00* (2006.01)
*G09G 5/00* (2006.01)
*G06F 3/033* (2006.01)

(52) U.S. Cl.
USPC .................... 345/501; 345/156; 345/158

(58) Field of Classification Search
USPC ............... 361/679.3, 679; 345/158, 1.1–3.4, 345/501–522, 25, 156
See application file for complete search history.

(56) References Cited

U.S. PATENT DOCUMENTS

| | | |
|---|---|---|
| 3,363,104 A | 1/1968 | Waite et al. |
| 3,761,947 A | 9/1973 | Volkmann et al. |
| 4,620,222 A | 10/1986 | Baba et al. |
| 4,691,366 A | 9/1987 | Fenster et al. |
| 4,823,194 A | 4/1989 | Mishima et al. |
| 4,992,666 A | 2/1991 | Robertson |
| 5,086,478 A | 2/1992 | Kelly-Mahaffey et al. |
| 5,272,473 A | 12/1993 | Thompson et al. |
| 5,274,494 A | 12/1993 | Rafanelli et al. |

(Continued)

FOREIGN PATENT DOCUMENTS

| | | |
|---|---|---|
| EP | 167314 | 1/1986 |
| EP | 2053844 | 4/2009 |

(Continued)

OTHER PUBLICATIONS

Koschan et al., "Finding Objects in a 3D Environment by Combining Distance Measurement and Color Indexing," IEEE, vol. 1, pp. 858-861, Oct. 2001.
Author Unknown, "YCbCr," http://en.wikipedia.org/wiki/Y%27CbCr, 4 pages, at least as early as Jun. 17, 2010.
Sokolova et al., "Experiments in Stereo Vision," Computer Science 570, Final Project, http://disparity.wikidot.com/, 14 pages, at least as early as Jun. 16, 2010.

(Continued)

*Primary Examiner* — Kee M Tung
*Assistant Examiner* — Leon T Cain, II
(74) *Attorney, Agent, or Firm* — Brownstein Hyatt Farber Schreck, LLP (57) ABSTRACT

Computer systems and methods may provide a projection display as a primary visual output. In particular, a computer system may include an integrated projector output. Such a computer system may be substantially or even entirely externally wire-free. Methods of image processing may involve a computer system with an integrated projector output. Such methods may involve using raw presentation data for image processing, including adjustment and/or correction for brightness, color and/or geometry artifacts generated from aspects of the projection surface (such as geometry, texture, color or the like), the surroundings (such as ambient light), the relation of the computer system (or integrated projector output) to the projection surface (such as distance, orientation or the like), and/or the relation of a user/viewer to the projection surface (such as viewing angle, distance or the like).

17 Claims, 5 Drawing Sheets

(56) References Cited

U.S. PATENT DOCUMENTS

| | | | |
|---|---|---|---|
| 5,283,640 A | 2/1994 | Tilton | |
| 5,337,081 A | 8/1994 | Kamiya et al. | |
| 5,625,408 A | 4/1997 | Matsugu et al. | |
| 5,748,199 A | 5/1998 | Palm | |
| 5,757,423 A | 5/1998 | Tanaka et al. | |
| 6,002,423 A | 12/1999 | Rappaport et al. | |
| 6,043,838 A | 3/2000 | Chen | |
| 6,215,898 B1 | 4/2001 | Woodfill et al. | |
| 6,282,655 B1 | 8/2001 | Given | |
| 6,310,662 B1 | 10/2001 | Sunakawa et al. | |
| 6,339,429 B1 | 1/2002 | Schug | |
| 6,389,153 B1 | 5/2002 | Imai et al. | |
| 6,416,186 B1 | 7/2002 | Nakamura | |
| 6,421,118 B1 | 7/2002 | Shaar | |
| 6,456,339 B1 | 9/2002 | Surati et al. | |
| 6,516,151 B2 | 2/2003 | Pilu | |
| 6,525,772 B2 | 2/2003 | Johnson et al. | |
| 6,560,711 B1 | 5/2003 | Given et al. | |
| 6,561,654 B2 | 5/2003 | Mukawa et al. | |
| 6,614,471 B1 | 9/2003 | Ott | |
| 6,618,076 B1 | 9/2003 | Sukthankar et al. | |
| 6,636,292 B2 | 10/2003 | Roddy et al. | |
| 6,807,010 B2 | 10/2004 | Kowarz | |
| 6,862,022 B2 | 3/2005 | Slupe | |
| 6,862,035 B2 | 3/2005 | Jeong et al. | |
| 6,877,863 B2 | 4/2005 | Wood et al. | |
| 6,903,880 B2 | 6/2005 | Beatson et al. | |
| 6,921,172 B2 | 7/2005 | Ulichney et al. | |
| 6,924,909 B2 | 8/2005 | Lee et al. | |
| 6,930,669 B2 * | 8/2005 | Weiner et al. | 345/156 |
| 6,931,601 B2 | 8/2005 | Vronay et al. | |
| 6,970,080 B1 | 11/2005 | Crouch et al. | |
| 7,028,269 B1 | 4/2006 | Cohen-Solal et al. | |
| 7,058,234 B2 | 6/2006 | Gindele et al. | |
| 7,079,707 B2 | 7/2006 | Baron | |
| 7,103,212 B2 | 9/2006 | Hager et al. | |
| 7,123,292 B1 | 10/2006 | Seeger et al. | |
| 7,123,298 B2 | 10/2006 | Schroeder et al. | |
| 7,307,709 B2 | 12/2007 | Lin et al. | |
| 7,324,681 B2 | 1/2008 | Chang et al. | |
| 7,352,913 B2 | 4/2008 | Karuta et al. | |
| 7,370,336 B2 | 5/2008 | Husain et al. | |
| 7,413,311 B2 | 8/2008 | Govorkov et al. | |
| 7,453,510 B2 | 11/2008 | Kolehmainen et al. | |
| 7,483,065 B2 | 1/2009 | Gruhike et al. | |
| 7,512,262 B2 | 3/2009 | Criminisi et al. | |
| 7,551,771 B2 | 6/2009 | England | |
| 7,561,731 B2 | 7/2009 | Wallace et al. | |
| 7,567,271 B2 | 7/2009 | Berestov | |
| 7,570,881 B2 | 8/2009 | Perala et al. | |
| 7,590,335 B2 | 9/2009 | Kobayashi et al. | |
| 7,590,992 B2 | 9/2009 | Koplar et al. | |
| 7,594,319 B2 | 9/2009 | Nakamura et al. | |
| 7,598,980 B2 | 10/2009 | Imai et al. | |
| 7,613,389 B2 | 11/2009 | Suzuki et al. | |
| 7,629,897 B2 | 12/2009 | Koljonen | |
| 7,641,348 B2 | 1/2010 | Yin et al. | |
| 7,643,025 B2 | 1/2010 | Lange | |
| 7,653,304 B2 | 1/2010 | Nozaki et al. | |
| 7,658,498 B2 * | 2/2010 | Anson | 353/69 |
| 7,834,846 B1 * | 11/2010 | Bell | 345/156 |
| 7,869,204 B2 * | 1/2011 | Bair et al. | 361/679.3 |
| 7,901,084 B2 * | 3/2011 | Willey et al. | 353/49 |
| 7,925,077 B2 | 4/2011 | Woodfill et al. | |
| 7,964,835 B2 | 6/2011 | Olsen et al. | |
| 8,044,880 B2 | 10/2011 | Nakamura et al. | |
| 8,147,731 B2 | 4/2012 | Minnakayala et al. | |
| 8,319,822 B2 | 11/2012 | McClatchie | |
| 2002/0021288 A1 | 2/2002 | Schug | |
| 2003/0038927 A1 * | 2/2003 | Alden | 353/122 |
| 2003/0086013 A1 | 5/2003 | Aratani | |
| 2003/0117343 A1 * | 6/2003 | Kling | 345/32 |
| 2004/0008288 A1 * | 1/2004 | Pate et al. | 348/742 |
| 2004/0119988 A1 | 6/2004 | Chen et al. | |
| 2004/0189796 A1 | 9/2004 | Ho et al. | |
| 2004/0193413 A1 | 9/2004 | Wilson et al. | |
| 2005/0132408 A1 | 6/2005 | Dahley et al. | |
| 2005/0146634 A1 | 7/2005 | Silverstein et al. | |
| 2005/0168583 A1 | 8/2005 | Thomason | |
| 2005/0182962 A1 | 8/2005 | Given et al. | |
| 2005/0237385 A1 | 10/2005 | Kosaka | |
| 2005/0280786 A1 * | 12/2005 | Moiroux et al. | 353/119 |
| 2006/0140452 A1 | 6/2006 | Raynor et al. | |
| 2006/0197843 A1 | 9/2006 | Yoshimatsu | |
| 2007/0027580 A1 | 2/2007 | Ligtenberg et al. | |
| 2007/0177279 A1 | 8/2007 | Cho et al. | |
| 2007/0236485 A1 | 10/2007 | Trepte | |
| 2007/0300312 A1 | 12/2007 | Chitsaz et al. | |
| 2008/0062164 A1 | 3/2008 | Bassi et al. | |
| 2008/0131107 A1 | 6/2008 | Ueno | |
| 2008/0158362 A1 | 7/2008 | Butterworth | |
| 2008/0191864 A1 * | 8/2008 | Wolfson | 340/524 |
| 2009/0008683 A1 | 1/2009 | Nishizawa | |
| 2009/0027337 A1 | 1/2009 | Hildreth | |
| 2009/0051797 A1 | 2/2009 | Yao | |
| 2009/0079734 A1 | 3/2009 | McDaniel | |
| 2009/0115915 A1 * | 5/2009 | Steinberg et al. | 348/745 |
| 2009/0116732 A1 | 5/2009 | Zhou et al. | |
| 2009/0221368 A1 | 9/2009 | Yen et al. | |
| 2009/0262306 A1 * | 10/2009 | Quinn et al. | 353/25 |
| 2009/0262343 A1 | 10/2009 | Archibald | |
| 2009/0273679 A1 | 11/2009 | Gere et al. | |
| 2009/0309826 A1 | 12/2009 | Jung et al. | |
| 2010/0060803 A1 | 3/2010 | Slack et al. | |
| 2010/0061659 A1 | 3/2010 | Slack et al. | |
| 2010/0073499 A1 | 3/2010 | Gere et al. | |
| 2010/0079426 A1 | 4/2010 | Pance et al. | |
| 2010/0079653 A1 | 4/2010 | Pance | |
| 2010/0079884 A1 | 4/2010 | Gere et al. | |
| 2010/0083188 A1 | 4/2010 | Pance et al. | |
| 2010/0103172 A1 | 4/2010 | Purdy | |
| 2010/0118122 A1 | 5/2010 | Hartman | |
| 2010/0309287 A1 | 12/2010 | Rodriguez | |
| 2010/0309315 A1 | 12/2010 | Hogasten et al. | |
| 2011/0064327 A1 | 3/2011 | Dagher | |
| 2011/0074931 A1 | 3/2011 | Bilbrey et al. | |
| 2011/0075055 A1 | 3/2011 | Bilbrey | |
| 2011/0115964 A1 | 5/2011 | Gere | |
| 2011/0149094 A1 | 6/2011 | Chen et al. | |
| 2011/0200247 A1 | 8/2011 | Ravid et al. | |
| 2011/0242286 A1 | 10/2011 | Pace et al. | |
| 2011/0317005 A1 | 12/2011 | Atkinson | |
| 2012/0044322 A1 | 2/2012 | Tian et al. | |
| 2012/0044328 A1 | 2/2012 | Gere | |
| 2012/0050490 A1 | 3/2012 | Chen et al. | |
| 2012/0076363 A1 | 3/2012 | Kessler et al. | |

FOREIGN PATENT DOCUMENTS

| | | |
|---|---|---|
| JP | 2002354493 | 12/2002 |
| JP | 2003-299113 | 10/2003 |
| JP | 2005-197792 | 7/2005 |
| KR | 10-2007-0100890 | 10/2007 |
| KR | 10-2009-0049343 | 5/2009 |
| WO | WO93/11631 | 6/1993 |
| WO | WO2007/100057 | 9/2007 |
| WO | WO2009/001512 | 12/2008 |

OTHER PUBLICATIONS

Stern et al., "Three-Dimensional Image Sensing, Visualization, and Processing Using Integral Imaging," *Proceedings of the IEEE*, Mar. 2006, vol. 94, No. 3, pp. 591-607.

Thomas, "An Introduction to Photo Stitching," *Eastern Suburbs Photographic Society*, 2007, 12 pages.

Wang, *Video Processing and Communications*, 2001, Prentice-Hall, Chapter 1: Video Formation, Perception, and Representation, pp. 1-32.

\* cited by examiner

COMPUTER SYSTEMS AND METHODS WITH PROJECTED DISPLAY

CROSS-REFERENCE TO RELATED APPLICATIONS

This application is related to copending patent application Ser. No. 12/206,554, entitled "Method and Apparatus for Depth Sensing Keystoning," and copending patent application Ser. No. 12/206,546, entitled "Projection Systems and Methods," both filed on Sep. 8, 2008, the entire disclosures of which are incorporated herein by reference.

TECHNICAL FIELD

This invention relates generally to computer systems and methods, and more specifically to computer systems and methods involving a projected display.

BACKGROUND

Computer systems, including personal computers, are obviously well known. Conventional computer systems include basics such as input devices (keyboard, mouse, trackball, stylus, touchscreen, and the like), storage devices (hard drive, disc drive, CD-ROM drive, and the like), one or more processors (CPU, dedicated microprocessor, and the like), a display (cathode ray tube (CRT), liquid crystal display (LCD), or the like), and other miscellaneous elements, both general and specific (memory, bus, video/graphics card, modem, and the like). In general, desktop personal computers provide more computing power and/or capabilities than comparable laptop personal computers. However, laptops offer the advantage of easy portability. Although advancements have been made in the displays available for computers, for example, providing improved resolution, space savings compared to CRTs, and larger and/or lighter displays for laptops, conventional computer systems employ some form of display screen or monitor.

Projector systems are often used to make presentations to audiences, such as at business meetings. Such systems may be adapted to project a presentation, such as a slide show, on a screen, wall or other surface. The presentation may be stored on a computer, such as a laptop, which may be coupled to the projector system. The display of the presentation by the projector system may be controlled by the computer or a peripheral device thereof, such as a mouse.

SUMMARY

Various embodiments described herein are directed to computer systems and methods that provide a projection display as a primary visual output. In particular, various embodiments involve a computer system including an integrated projector output.

Various embodiments contemplate a substantially or even entirely externally wire-free computer system. That is, various embodiments described herein provide a computer system including a main housing that houses a central processing unit and an integrated projector output, and at least one peripheral input device configured to communicate with the central processing unit wirelessly. The main housing may also house a wireless network interface. Speakers may be integrated with the main housing and/or may be configured for wireless communication with the central processing unit. Thus, the only wire from the main housing may be a power cord. Alternatively, in some embodiments, the computer system may include an inductive wireless charge system, an energy storage system, or one or more batteries. Thus, the main housing may be entirely externally wire-free.

Various embodiments contemplate a computer system with an integrated projection system. The projection system may include: a projector configured to project an image based on presentation data; and at least one sensor configured to capture sensor data of the image projected by the projector. The computer system may be configured to make adjustments with the projection system based on the sensor data. In such embodiments, the computer system may be configured to perform adjustments based on raw presentation data, that is, presentation data directly from a source of the presentation data.

In some embodiments, the computer system may be configured to perform at or near real time per-pixel and per-color, for example, red, green and blue (RGB), image processing and image correction. Various embodiments contemplate image processing and/or correction that may include horizontal and/or vertical keystone correction, projection surface curvature compensation, projection surface texture compensation, viewing angle compensation, compensation for roll/yaw of the projector, and/or ambient lighting compensation. The image processing and/or correction may thus correct the image to reduce and/or remove brightness, color and/or geometry artifacts, whether originating from or attributable to the projection surface (geometry, texture, color), ambient light, viewing angle, and the like.

In some embodiments, the computer system may define a display path between a presentation data source and projector output. The image processing and/or correction may be performed by the computer system within the display path. The display path may form a closed loop system with one or more image sensors, such as a camera, and/or other sensors, such as accelerometers, proximity sensors, depth sensors, and the like. The sensor(s) may obtain data regarding an image projected by the projector output, which may be used to correct the image projected by the projector output. For example, proximity sensor(s) may provide data to allow the computer system to make adjustments for a distance or distances to the projection surface. Accelerometer(s) may provide data to adjust projector output-image orientation.

In some embodiments, the integrated projector of the computer system may include a light emitting diode (LED) or laser diode based light source. Further, the light source may be an RGB or a white light source, such as a light bulb. Further, the integrated projector may include an optical engine capable of extreme angle projection, for example, with f-stop numbers 1.0-1.8, to allow the computer system to be placed relatively close (e.g., <15 inches) to a surface for projection, while still achieving a relative large image (e.g., >40 inches).

Various embodiments contemplate methods for image processing as described herein.

Various embodiments contemplate a computer readable storage medium including stored instructions that, when executed by a computer, cause the computer to perform any of the various methods described herein and/or any of the functions of the systems disclosed herein.

These and other embodiments and features will be apparent to those of ordinary skill in the art upon reading this disclosure in its entirety, along with the appended claims.

DETAILED DESCRIPTION OF THE INVENTION

Computer systems and methods disclosed herein may provide an entirely new category of computer systems as compared to desktops and laptops. Various embodiments contemplate using an integrated projector output as a primary visual output, as opposed to the conventional display screens involved with desktop and laptop computers. Such an approach may allow the computer system to be a "desk-free computer," by allowing the computer system to be placed wherever desired, on a desk or table, but also on a shelf, on a floor, or even suspended from a wall or ceiling. The integrated projector output may provide flexibility in locating the computer system, by allowing any suitable surface to perform as a display screen. The integrated projector may also provide flexibility in the location, relative to the computer system and/or the user, and/or in the size of the projected image. Display screens for both laptops and desktops are fixed in size, and have limited flexibility in location relative to the computer, either by wired connection and/or other physical constraint.

Further, computer systems and methods disclosed herein may provide a substantially or entirely externally wire-free computer system and/or operation. By providing wireless interfaces for input devices, such as keyboard and mouse, networking, and the like, the integrated projector output may eliminate any need for wires connecting the computer system to peripherals. Thus, in some embodiments, only a power cord may be provided to the computer system. In other embodiments, the computer system may be powered wirelessly, for example, by an inductive charge system, an energy storage system, and/or one or more batteries.

As will be further understood from the following description, computer systems and methods disclosed herein may also provide an advancement over "smart projectors" that include image processing and/or correction capabilities. Regardless of the processing capabilities of such "smart projectors," which may be surpassed and justified for a computer system as described herein, a "smart projector" is limited to image processing and correction using processed presentation data.

Specifically, conventional projectors involve receiving processed presentation data according to a set protocol and at a set resolution. For example, raw presentation data may be read from a source, such as a digital video disc (DVD), by a DVD player. The DVD player makes adjustments to the presentation data, such as degrading the resolution to that of the projector, so that the presentation data is provided to the projector in a format as required by the projector. Thus, when a "smart projector" performs image processing and/or correction, the projector acts on the presentation data as provided, not the raw presentation data from the source. This is true even a computer system is used to provide the presentation data to the projector.

In the computer systems and methods described herein, image processing and adjustment or correction may be performed on the raw presentation data. The image processing and/or correction may be performed by a computer system that has access to the raw presentation data. Thus, the computer system has more information/knowledge regarding the presentation data, not being limited to processed data that may be modified in a manner that provides less information and/or knowledge of the processed data is limited. Thus, the image processing and/or correction may be performed in a richer space, that is, raw space. For pixelated images sources, higher resolution of the raw data may be provide more information. In the case of vector-based image sources, the raw data may be in a deeper format (e.g., more pixels per color component) prior to being rasterized for display. Thus, adjustments to the presentation data may be performed in a lossless manner before rasterizing the image.

Because the computer systems described herein include an integrated projector output, no data transfer to a separate projector is necessary, and compression and loss may be comparatively reduced or minimized. The image processing and/or correction may be performed by the computer system, rather than performed by an external projector to which the presentation data is provided. Thus, the raw presentation data may be modified before being scaled down to the capability of the projector output. In other words, the resolution of the presentation data may be maintained for image processing and/or correction.

Further, embodiments of the computer systems and methods disclosed herein may provide a speed advantage over "smart projectors." As noted above, the image processing and/or correction may be performed in or near real-time. Because the one or more sensors that provide sensor data for image processing/correction are part of the computer system, a relatively short dynamic loop exists to allow almost immediate processing/correction of the presentation data. Also, because the computer system has knowledge of the presentation data, for example, scenes and/or frames, the computer system does not need to perform the analysis of the presentation data that would be required by a "smart projector." Thus, embodiments of the computer systems and methods disclosed herein may apply image processing and/or correction based on feedback data from sensor(s), without any delay for such analysis. Embodiments of the computer systems and methods disclosed herein may allow data to be shared between any parts of the display pipeline and processing may thus be performed at any stage in the display pipeline.

Current computer systems employ the use of video image processing to optimize video rendering based on the capabilities of the display device and the display link, and based on the static and dynamic properties of the display device and its environment. As such, when conventional computers are used with projectors, there are multiple stages of processing and various image path "bottlenecks" that may be avoided by the systems and methods described herein.

A projector may differ fundamentally from a conventional computer display in a number of ways. For example, a projector may use a six-color wheel to derive six channels of color from a single bulb. Using six channels of color, as compared to using three, may help improve brightness of the projected image as well as widen the color gamut. Because conventional computer displays, such as cathode ray tubes (CRTs) and liquid crystal displays (LCDs), only use three sources of colored light or three color filters (i.e., red-greenblue (RGB)), standard display links, such as VGA, DVI, DisplayPort and the like, are designed to transmit three channels of color. As such, video image processing hardware and software must extrapolate the three channels of color into six channels for the projector. The computer systems and methods described herein may directly drive projection display with all six channels of color information, rather than downsampling and upsampling as required for a conventional computer connected to a projector for output.

The static environmental characteristics of projectors may also be very different than with conventional computer displays. For example, if a projector is set up at an angle relative to a projection surface, the projector may employ video image processing to perform keystoning, resulting in areas of the projected image having higher pixel densities than others. Because conventional computer displays always have consistent/equal pixel density, standard display links do not accommodate varied pixel densities. The projector must use its image processing to extrapolate pixels in greater density. Lesser density bits are generally "thrown out," which may result in "lossy" compression. The computer systems and methods described herein may directly drive the projection display with varying pixel densities, and thus may avoid such disadvantages of external projectors.

The dynamic environmental characteristics of projectors may also be very different than with conventional computer displays. For example, if a projector is moved during operation, the keystoning adjustments may be automatically updated based on the new angle and offset from the projection surface. Because conventional computer displays do not need to perform such dynamic adjustments, standard display links are not designed to include dynamic feedback channels. The projector must use data it receives based on the previous environmental setup and perform video image processing to help compensate for the new environmental setup. The computer systems and methods described herein may dynamically adjust the video feed based on the dynamic needs of the projection environment.

The computer systems and methods described herein may achieve a synergy that is not possible with conventional computers and projectors, which may be realized in terms of the operating system, system interaction, and/or performance. This may stem, for example, from the computer system's knowledge of the computer system's projection output and the surface on which it is projecting. The operating system may be designed to include larger icons and/or text and/or a different style based on the knowledge that the user is likely further away from the displayed image than conventional computer experiences. The computer systems and methods described herein may provide a suitable solution, particularly because the computer system has direct access to the raw content/information to be displayed and may manipulate the raw content/information directly. Lacking knowledge of an external projector or the projection surface, a conventional computer is unlikely to be capable of providing acceptable adjustment without distortion and/or artifacts in the projected image.

One example is that the computer systems and methods described herein may directly manipulate the raw content to take into account the surface onto which the image is projected. A decision may be made to highlight certain things, such as a menu bar or other icon, based on the projection surface so as to make those things clearer or more visible to the user.

Another example is that the computer systems and methods described herein may alter text, images and/or icons based on other adjustments being made based on the projection surface. For example, if the image is being keystoned, making the image smaller, a decision may be made to compensate and improve the user's experience by displaying less things, and rendering larger text, images and/or icons.

The synergy may also stem, for example, from the computer system's knowledge of the raw content/information, particularly, the next image to be provided to the projection output. With such knowledge, the computer system may perform image adjustments or corrections immediately, prior to projection, without the need to process the projected image information.

Performing adjustments or corrections at the highest possible resolution may lessen the generation of artifacts. When adjustments are performed on lower resolution data, artifacts are often generated.

Various embodiments of the computer systems and methods disclosed herein may involve controlling the light source of the projector output. Conventional projectors, including "smart projectors," either do not control the light source for image adjustment and/or correction or only do so as a static adjustment after a calibration is performed. Light sources contemplated for embodiments disclosed herein are dynamically controllable—allowing the intensity and/or color of the light source to be controlled dynamically. This may allow various embodiments to achieve better brightness adjustment, better color gamut adjustment, and/or better white balance adjustment, for example, based on knowledge/information regarding the presentation data.

In particular, in some embodiments the computer systems and methods disclosed herein may dynamically control the brightness of each color component, as well as the color content, at any given time. Because the computer system has information/knowledge regarding the scene to be displayed, as discussed herein, embodiments of the computer systems and methods may dynamically and independently adjust each intensity and color of each component of the light source. Thus, various embodiments may provide a variable display color profile with a dynamically adjustable white point by directly controlling the light source. Conventional displays and projectors require changing between specific profiles, which typically results in visual artifacts.

For example, if the presentation data is full of very dark images, the computer systems and methods disclosed herein may reduce the power supplied to each light source. This may allow control of the brightness within a new range with the same number of bits of resolution, providing a finer differentiation of the dark shades. The computer systems and methods disclosed herein may thus make better use of the existing color gamut.

If the environment for projection is relatively bright, very fine variations may be difficult for the human eye to distinguish or recognize. The computer systems and methods disclosed herein may use individual colors sequentially in time to increase the brightness under such conditions, by overlapping the times when each color is turned on. Although the exactness of the color may be reduced, the increase in brightness may be preferable in some circumstances.

Various embodiments of the computer systems and methods disclosed herein may be used to implement or used in conjunction with the various systems and methods disclosed in the incorporated copending application Ser. No. 12/206, 546. In particular, embodiments of the computer systems disclosed herein may operate as the projection system thereof.

Further, in addition to any currently known or hereafter developed image processing techniques, embodiments of the computer systems and methods disclosed herein may be particularly adapted to perform the adjustment/calibration methods and keystoning methods disclosed in the incorporated copending applications Ser. Nos. 12/206,546 and 12/206,554.

Figure 1:
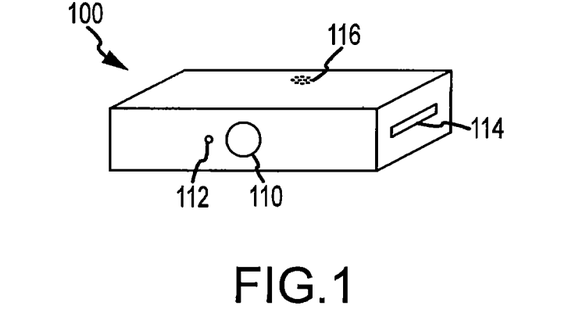
FIG. 1 is a perspective view of an example of a computer system including an integrated projector output.

Turning now to particular embodiments that provide examples of how computer systems and methods may be implemented, an example of a computer system 100 is illustrated in FIG. 1. It should be understood that details of the computer system 100 not specifically discussed herein may be implemented in any suitable manner, such as conventional and well known in the art.

The computer system 100 may include an integrated projector output 110 as a primary visual display. In some embodiments, the projector output 110 may be the only display for the computer system 100. However, it may be desirable in some embodiments to have an interface for connecting the computer system 100 with a monitor or other display device as a secondary or alternative display. It should be understood that the integrated projector output 110 allows for an externally wire-free computer system 100 to be implemented. As such, the interface for connecting the computer system 100 to a display device may be a wireless interface to maintain the wire-free feature of the computer system.

In some embodiments, the computer system 100 may be configured to allow the projector output 110 to operate as an ordinary projector. For example, all components of the computer system 100 not needed for operation of the projector output 110 may be turned off, such that an external video/image/audio source may be connected to display through the projector output 110. Similarly, the computer system 100 may be configured such that all components other than those needed for operation of the projector output 110 and a data source input, such as a DVD drive, may be turned off, allowing the computer system 100 to operate in a mode that resembles a conventional data source input, such as a DVD player, coupled to a projector. In other words, it is contemplated that the computer system 100 may be wired such that the projector output 110 may be operated separately as a conventional projector, and that the computer system 100 may be wired such that one or more data source inputs of the computer system 100 may be operated separately, in conjunction with the projector output 110.

The computer system 100 may also include one or more sensors, such as an image sensor 112. The image sensor 112 may be, for example, a camera. The image sensor 112 may be configured to capture image data regarding an image projected from the integrated projector output 110. Similarly, other sensors as discussed herein may be configured to obtain data regarding the image from the projector output 110, the surface on which the image is projected, the ambient light, the integrated projector/projector output's orientation, roll, yaw and the like, and other information that may be used for image processing and/or correction.

The computer system 100 may include a device for receiving presentation data, such as a CDROM/DVD player 114. It should be understood that alternative or additional devices may be included, such as floppy disk drives, USB drives, or other storage media-specific drives, ports or interfaces, and the like, that are configured to read presentation data from corresponding media. Presentation data in the context of this disclosure is intended to include any visual or audio-visual data that may be processed and displayed for viewing, such as video, slides, movies, graphics, images, pictures, or the like.

Figure 2:
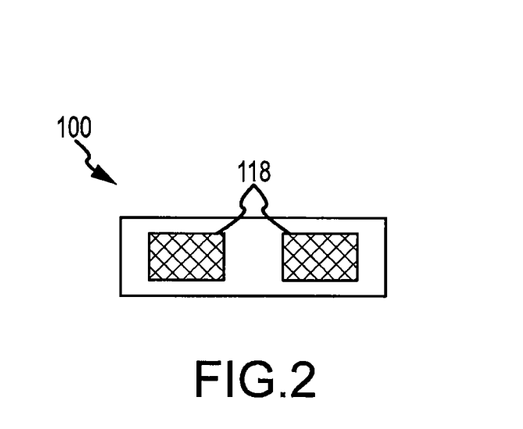
FIG. 2 is a rear view of the computer system of FIG. 1.

The computer system 100 may include a microphone 116 or other audio input device. The microphone 116 or other device may be configured to receive audio, such as voices, from the surroundings to enable communications via the computer system 100 and a network (not shown), for example. In particular, this may enable the computer system 100 to be used to implement or used in conjunction with the various systems and methods disclosed in the incorporated copending application Ser. No. 12/206,546. Similarly, the computer system 100 may include one or more speakers 118. Although two speakers 118 are illustrated in FIG. 2, it should be understood that one or more than two speakers may be employed as well. The speakers 118 may be configured to output the audio of the presentation data, the audio input to the microphone 116, and/or any audio received from remote participants as disclosed in the incorporated copending application Ser. No. 12/206,546.

Figure 3:
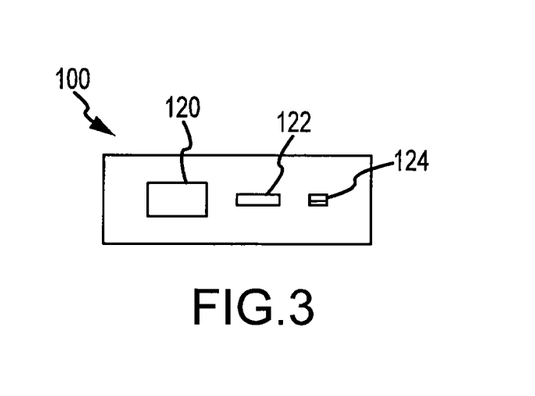
FIG. 3 is a side view of the computer system of FIG. 1.
Figure 5:
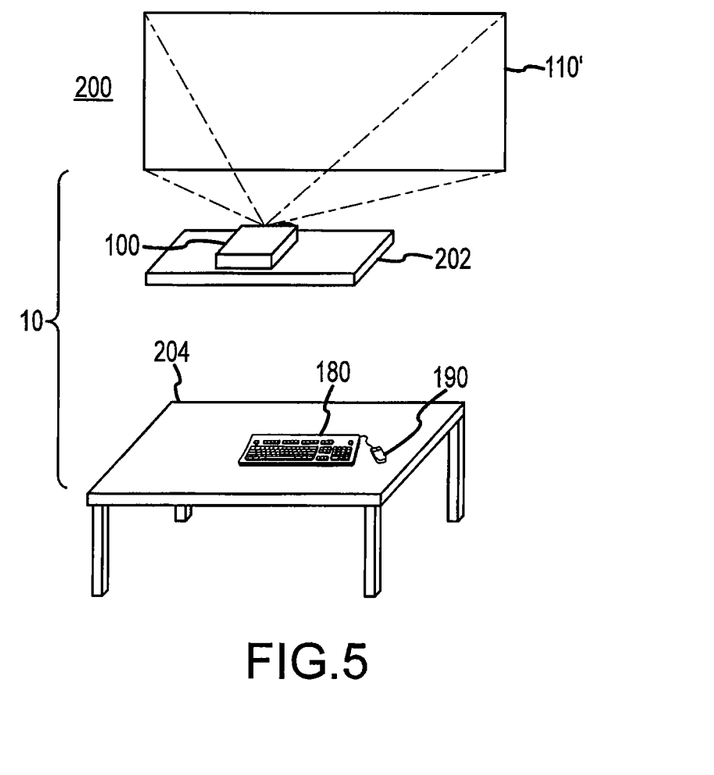
FIG. 5 is a perspective view of the computer system of FIG. 1 in a computing environment.

As illustrated in FIG. 3, the computer system may also include various interfaces for interacting with peripheral devices, networking, and/or data input/output. For example, the computer system 100 may include a wireless interface 120, which may be configured to provide wireless communication between the computer system 100 and one or more peripheral devices, such as a keyboard 180 or a mouse 190, as illustrated in FIG. 5. The wireless interface may employ radio frequency (RF), infrared (IR) or any other suitable mode of wireless communication. The computer system 100 may include a wireless network interface 122, such as a modem or other suitable device or a slot configured to receive such a device. Further, the computer system 100 may include a USB port 124 to allow the computer system 100 to share data with other devices, such as printers, cameras, video cameras, music players, and the like. It should be understood that other interfaces, such as peripheral component interconnect express (PCI-E) or the like, may be included, additionally or alternatively.

Figure 4:
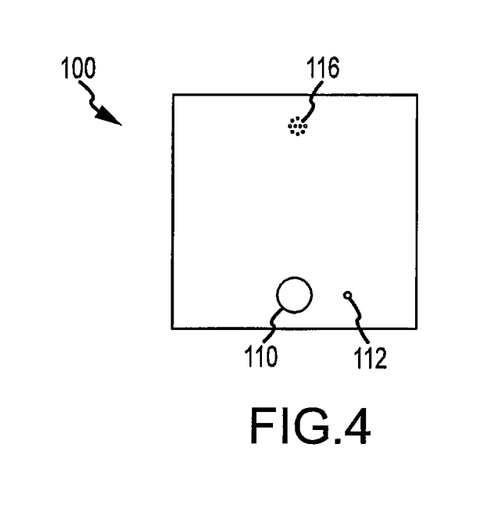
FIG. 4 is a top view of another example of a computer system including an integrated projector output.

As illustrated in FIG. 4, an alternative configuration of the computer system 100 may provide the integrated projector output 110 and/or the image sensor 112 or other sensor(s) on a top, toward the rear of the computer system 100, rather than on the front as illustrated in FIG. 1. It should be understood that placement of the projector output 110, image sensor 112 and/or other sensor(s) may be determined to provide flexibility in placement of the computer system 100 for use. For example, the configuration shown in FIG. 4 may allow the computer system 100 to be placed on a shelf with the front of the computer system close to or even against the wall supporting the shelf, with the projector output 110 projecting an image on the wall. The configuration shown in FIG. 1 may allow the computer system 100 to be mounted from and close to the ceiling of a room, with the projector output 110 projecting an image on a wall. Although not illustrated in detail, it should be understood that, regardless of the placement of the projector output 110, the computer system 100 may include a suitable optical and/or mechanical adjustment mechanism to alter the angle of the projector output 110, for example, to allow proper positioning of the projected image once the computer system 100 is in place or mounted.

Thus, the computer system 100 may be positioned as appropriate or desired to project an image onto a desired surface for viewing. For example, as illustrated in FIG. 5, the computer system 100 may be positioned to project an image onto a wall 200 by placing the computer system on a shelf 202 with the projector output 110 (not visible in FIG. 5) facing the wall 200. The image sensor 112 and/or other sensor(s) (also not visible in FIG. 5) may also face the wall 200 as the projection surface.

As discussed above, the computer system 100 maybe configured to wirelessly communicate with peripheral devices, such as the keyboard 180 and the mouse 190. In combination, the computer system 100, the keyboard 180 and/or the mouse 190 may define a wire-free computing environment 10. Although the keyboard 180 and the mouse 190 are shown on a desk or table 204, it should be understood that the desk or table 204 may not be needed to employ the computing environment 10. For example, a user may sit in a chair with the keyboard 180 in his lap and the mouse 190 on the armrest of the chair, a table next to the chair, or any substantially flat surface.

Although wireless peripheral devices are illustrated in FIG. 5 as physical devices, it should be understood that any suitable wireless technology may be employed. For example, the keyboard 180 may be implemented as a virtual or projected keyboard where the user's fingers are detected for determining input. Thus, embodiments of the computer systems described herein may involve any suitable wireless technologies that enable interaction with a computer.

As illustrated in FIG. 5, the integrated projector output 110 may include optics that provide a "short-throw" to enable close placement of the computer system 100 to a desired projection surface. For example, the optics may operate with f-stop numbers 1.0-1.8 to allow the computer system to be placed relatively close, for example within 15 inches of the desired projection surface. The optics may also provide a relatively large projected image, for example, with forty or more inch diagonal measurement. Any suitable arrangement of optics, whether known or hereafter developed, may be employed to implement the systems and methods described herein.

Figure 6:
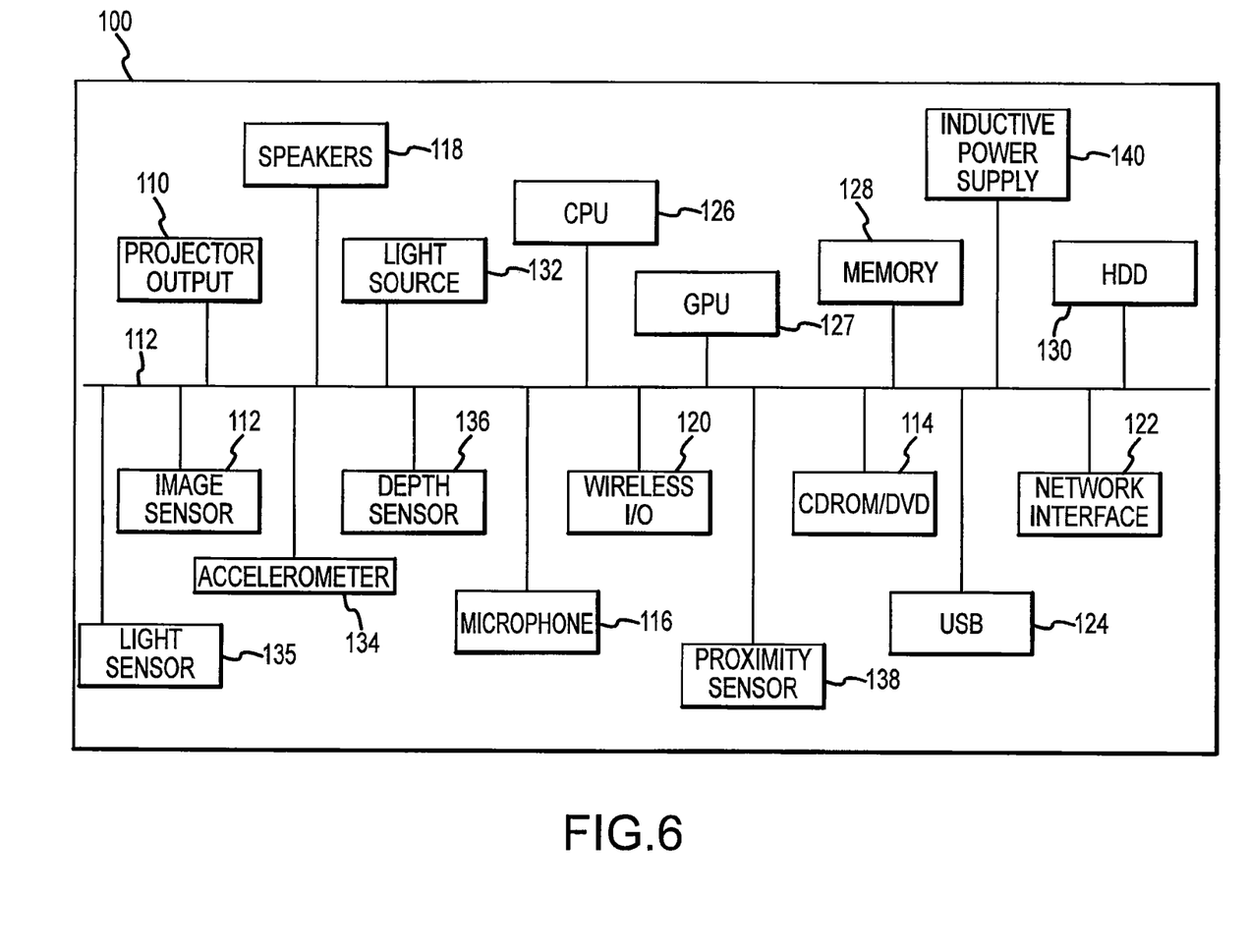
FIG. 6 is a schematic block diagram illustrating an example of the computer system of FIG. 1.

FIG. 6 illustrates a block diagram of various components that may be included in the computer system 100. As discussed above, the computer system 100 may include the integrated projector output 110, the image sensor 112, the CDROM/DVD 114, the microphone, the speakers 118, the wireless interface 120, the network interface 122 and the USB 124. The computer system 100 may also include a processor or CPU 126, a graphics processing unit (GPU) 127, a memory 128 and a storage device such as a hard disk drive (HDD) 130.

Additionally, the computer system 100 may include a controllable light source 132 for the projector output 110. The controllable light source 132 may be LED or laser diode-based or may be a light bulb, and may be controlled to vary intensity (brightness) and/or color in accordance with the image processing and/or image correction discussed herein. In particular, components of the light source 132 may be controlled individually, color by color.

As discussed above, the computer system 100 may include alternative or additional sensors configured to provide feedback data for image processing, adjustment and/or correction. For example, the computer system 100 may include one or more of an accelerometer 134, a light sensor 135, a depth sensor 136 and/or a proximity sensor 138. The accelerometer 134 may be configured to provide orientation data for the computer system 100, for example, to determine if the computer system 100 is off-axis or tilted. The light sensor 134 may be configured to determine ambient lighting conditions, such as brightness, color, and the like. The depth sensor(s) 136 may be configured to determine contour of the surface on which the image is to be projected by the projector output 110. The proximity sensor(s) 136 may be configured to determine the distance between the computer system 100/projector output 110 and the surface on which the image is to be projected by the projector output 110.

The image sensor(s) 112 may be configured to determine color of the projection surface, colors in the image, focus of the image, brightness of the image, and any other suitable image information. In some embodiments, the image sensor 112 may be a camera configured to determine texture of the projection surface. Such information, in combination with the data from the other sensors 134, 135, 136, 138, as appropriate or desired, may be used by the CPU 126 for image processing, adjustment and/or correction. In other words, the various sensors 112, 134, 135, 136; 138 may provide data regarding the projection surface, the projected image and/or the projector output 110 that may be used to adjust or correct the image projected by the projector output.

As discussed above, some embodiments of the computer system 100 may be completely externally wire-free, that is, require no external wires for implementing a complete computing environment. The computer system 100 may be substantially externally wire-free by only requiring a power cord to externally connect to a power supply, such as an electrical wall outlet. Alternatively, as illustrated in FIG. 6, the computer system 100 may include an inductive wireless charge system or internal inductive power supply 140.

Figure 7:
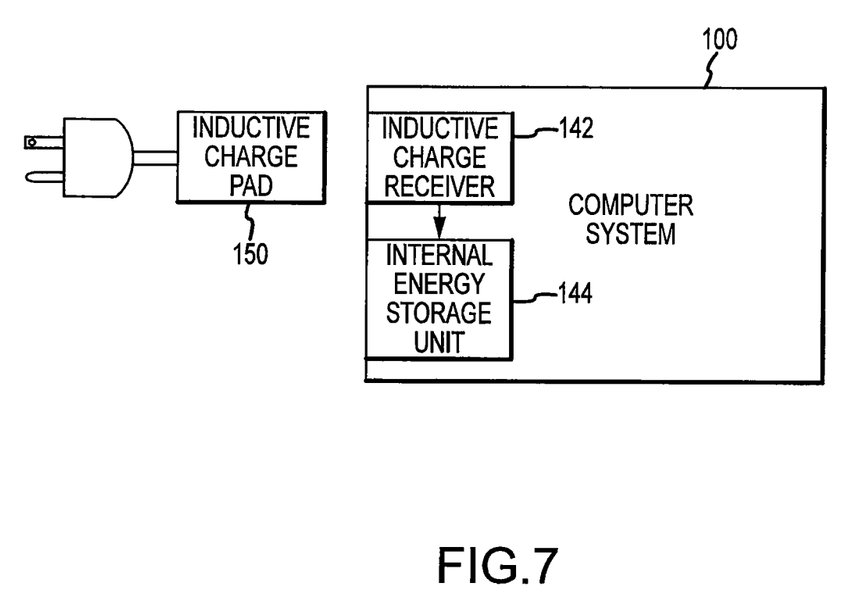
FIG. 7 is a schematic block diagram illustrating an example of an inductive power supply for the computer system of FIG. 1.

For example, as illustrated in FIG. 7, the computer system 100 may include an inductive charge receiver 142 and an internal energy storage unit 144 as the internal inductive power supply 140. The inductive charge receiver 142 may be configured to generate an induced current in response to a current flowing in an inductive charge element or pad 150, connected to a power source such as a wall outlet. The induced current in the inductive charge receiver 142 may generate a charge (potential difference) to be stored in the internal energy storage unit 144. Although it may be possible to power the computer system 100 directly from the induced current, it may be advantageous to include the energy storage unit 144, for example, to account for power source interruptions and/or fluctuations, to account for varying demand by the computer system 100, and/or to allow the computer system 100 to be used without the inductive charge pad 150 for a period of time. Thus, it should be understood that the internal storage unit 144 may comprise a removable/replaceable power cell or battery in some embodiments, and that such a power cell or battery may be employed as an alternative to an inductive power supply in some embodiments.

Figure 8:
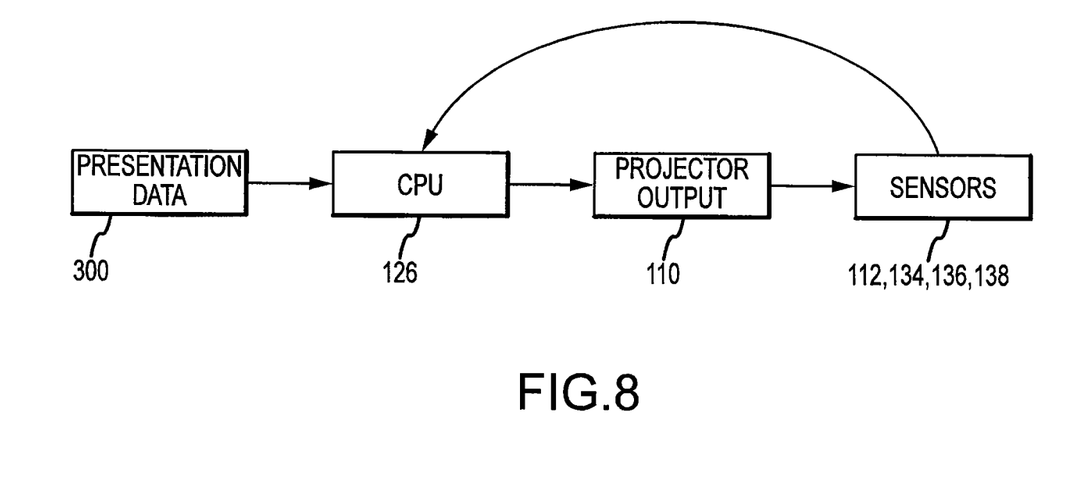
FIG. 8 is a block diagram illustrating an example of data flow for image processing/correction in the computer system of FIG. 1.

Although various image processing techniques and image correction techniques are known and may be employed by the computer system 100 as described herein, the computer system 100 may provide improved image processing, adjustment and/or correction because of its integrated nature. As illustrated in FIG. 8, the computer system 100 may define a display path between a source of presentation data and the integrated projector output 110. A closed loop system may be formed by the one or more sensors 112, 136, 134, 138 and the display path, with the sensor(s) obtaining and providing data regarding the projected image, the surroundings (e.g., projection surface, ambient lighting), and/or the projector output 110 to the computer system 100. Because the CPU 126 and/or the GPU 127 of the computer system 100 has/have access to raw presentation data 300, as read from the presentation data source, for example, by the CDROM/DVD 114, the CPU 126/GPU 127 can apply image processing and/or correction to the raw presentation data, before the presentation data is modified to suit the projector output 110.

Further, the CPU/GPU has knowledge regarding the raw presentation data 300, which is not available to downstream devices such as an external projector as discussed above.

The foregoing merely illustrates certain principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles disclosed in this document and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

The invention claimed is:

1. A computer system, comprising:
   at least one visual data source device;
   a graphics processing unit in communication with the at least one visual data source device;
   an integrated projector output in communication with the graphics processing unit, the integrated projector output configured to project an image onto a surface as a primary display of the computer system;
   a central processing unit configured to control the at least one video data source device, the graphics processing unit, and the integrated projector output at least in part;
   an image sensor in communication with at least one of the central processing unit or the graphics processing unit, the image sensor configured to obtain image data regarding the image projected from the integrated projector output; and
   a depth sensor in communication with the at least one of the central processing unit or the graphics processing unit, the depth sensor configured to obtain surface data regarding the surface onto which the image projected from the integrated projector output is projected;
   wherein the at least one of the central processing unit or the graphics processing unit is configured to perform image processing on visual data from the at least one visual data source device based on:
     the obtained image data from the image sensor; and
     the obtained surface data from the depth sensor.

2. The computer system of claim 1, further comprising a proximity sensor in communication with the at least one of the central processing unit or the graphics processing unit, the proximity sensor configured to obtain distance data to the surface onto which the image projected from the projector output is projected, the at least one of the central processing unit or the graphics processing unit configured to perform image processing visual data from the at least one visual data device based on the obtained distance data.

3. The computer system of claim 1, further comprising a light sensor in communication with the at least one of the central processing unit or the graphics processing unit, the light sensor configured to obtain ambient light data, the at least one of the central processing unit or the graphics processing unit configured to perform image processing on visual data from the at least one visual data source device based on the obtained ambient light data.

4. The computer system of claim 1, further comprising an orientation sensor in communication with the at least one of the central processing unit or the graphics processing unit, the orientation sensor configured to obtain orientation data regarding the integrated projector output, the at least one of the central processing unit or the graphics processing unit configured to perform image processing on visual data from the at least one visual data source device based on the obtained orientation data.

5. The computer system of claim 4, wherein the orientation sensor comprises an accelerometer.

6. The computer system of claim 4, wherein the orientation sensor is configured to obtain orientation data regarding the integrated projector output relative to the surface onto which the image projected from the integrated projector output is projected.

7. The computer system of claim 1, wherein the at least one of the central processing unit or the graphics processing unit is configured to perform image processing on raw presentation data from the at least one visual data source device.

8. The computer system of claim 1, wherein the at least one of the central processing unit or the graphics processing unit is configured to perform image processing in real time.

9. The computer system of claim 1, wherein the at least one of the central processing unit or the graphics processing unit is configured to perform image processing on a per-pixel basis.

10. The computer system of claim 1, wherein the at least one of the central processing unit or the graphics processing unit is configured to perform image processing on a per-color basis.

11. The computer system of claim 1:
    further comprising a dynamically controllable light surface;
    wherein the at least one of the central processing unit or the graphics processing unit is configured to control the dynamically controllable light source to vary at least one of an intensity or a color of the dynamically controllable light source.

12. The computer system of claim 11, wherein the dynamically controllable light source comprises an LED.

13. The computer system of claim 11, wherein the dynamically controllable light source comprises a laser diode.

14. The computer system of claim 1, further comprising a wireless interface configured to provide communication between the at least one of the central processing unit or the graphics processing unit and at least one peripheral device, whereby the system is substantially externally wire-free.

15. The computer system of claim 14, further comprising a wireless power supply, whereby the system is entirely externally wire-free.

16. The computer system of claim 15, wherein the wireless power supply comprises an inductive charge system.

17. The computer system of claim 1:
    further comprising a dynamically controllable light source;
    wherein the at least one of the central processing unit or the graphics processing unit is configured to control the dynamically controllable light source to accomplish image correction by at least dynamically adjusting a white point.

* * * * *